United States Patent
Kabatzke

(10) Patent No.: US 8,055,390 B2
(45) Date of Patent: Nov. 8, 2011

(54) CONTROLLER FOR A BLADE ADJUSTMENT ANGLE OF AT LEAST ONE ROTOR BLADE OF A WIND POWER PLANT

(75) Inventor: Wolfgang Kabatzke, Geesthacht (DE)

(73) Assignee: Nordex Energy GmbH, Norderstedt (DE)

( * ) Notice: Subject to any disclaimer, the term of this patent is extended or adjusted under 35 U.S.C. 154(b) by 696 days.

(21) Appl. No.: 12/118,184

(22) Filed: May 9, 2008

(65) Prior Publication Data

US 2009/0212567 A1    Aug. 27, 2009

(30) Foreign Application Priority Data

Feb. 26, 2008 (DE) .......................... 10 2008 011 139

(51) Int. Cl.
- G05D 3/12 (2006.01)
- G05D 5/00 (2006.01)
- G05D 9/00 (2006.01)
- B63H 3/10 (2006.01)
- B64C 11/30 (2006.01)
- F01D 7/00 (2006.01)
- F03D 3/06 (2006.01)
- F03D 9/00 (2006.01)
- F04D 29/26 (2006.01)
- H02P 9/04 (2006.01)

(52) U.S. Cl. ............ 700/286; 700/287; 416/26; 416/27; 416/43; 416/44; 416/89; 416/104; 290/44; 290/55

(58) Field of Classification Search .......... 700/286–287; 290/44–45, 55; 416/43–44, 26–27, 89, 104

See application file for complete search history.

(56) References Cited

U.S. PATENT DOCUMENTS

| | | | | |
|---|---|---|---|---|
| 4,160,170 A * | 7/1979 | Harner et al. | ................ | 290/44 |
| 4,161,658 A * | 7/1979 | Patrick | ................ | 290/44 |
| 4,189,648 A * | 2/1980 | Harner | ................ | 290/44 |
| 4,656,362 A * | 4/1987 | Harner et al. | ................ | 290/44 |
| 4,671,737 A * | 6/1987 | Whitehouse | ................ | 416/165 |
| 5,083,039 A * | 1/1992 | Richardson et al. | ................ | 290/44 |
| 5,155,375 A * | 10/1992 | Holley | ................ | 290/44 |
| 5,779,446 A * | 7/1998 | Althof et al. | ................ | 416/36 |
| 6,137,187 A * | 10/2000 | Mikhail et al. | ................ | 290/44 |
| 6,853,094 B2 * | 2/2005 | Feddersen et al. | ................ | 290/44 |
| 6,856,040 B2 * | 2/2005 | Feddersen et al. | ................ | 290/44 |

(Continued)

FOREIGN PATENT DOCUMENTS

| | | |
|---|---|---|
| DE | 3118259 | 12/1982 |
| DE | 69824965 T2 | 8/2005 |
| GB | 2023237 | 12/1979 |

(Continued)

OTHER PUBLICATIONS

"Taschenbuch der Regelungstechnik", H. Lutz, W. Wendt, "Element von Regeleinrichtungen und Regelstrecheken", pp. 158-159.

(Continued)

*Primary Examiner* — Ronald Hartman, Jr.
(74) *Attorney, Agent, or Firm* — Vidas, Arrett & Steinkraus, P.A.

(57) ABSTRACT

Controller for a blade adjustment angle for at least one rotor blade of a wind power plant, in which a first controller branch is switched for the determination of the blade adjustment angle depending on the operating states of the wind power plant, wherein at least one differentiating member is provided in the switched first controller branch.

8 Claims, 1 Drawing Sheet

U.S. PATENT DOCUMENTS

| | | | |
|---|---|---|---|
| 6,933,625 B2 * | 8/2005 | Feddersen et al. | 290/44 |
| 7,081,689 B2 * | 7/2006 | Tilscher et al. | 290/44 |
| 7,175,390 B2 * | 2/2007 | Wobben | 416/61 |
| 7,855,469 B2 * | 12/2010 | Stegemann et al. | 290/55 |
| 2003/0151259 A1 | 8/2003 | Feddersen et al. | |
| 2004/0094964 A1 | 5/2004 | Mikhail et al. | |
| 2008/0069692 A1 * | 3/2008 | Oohara et al. | 416/31 |
| 2009/0162202 A1 * | 6/2009 | Nies et al. | 416/147 |

OTHER PUBLICATIONS

"Windkraftanlagen", 3rd Edition, Springer, Verlag, Chapter 6.3 by Erich Hauck. (Attached is English version of 2nd Edition, "Wind Turbines" 2nd Edition, to aid Examiner in the technical background.
Bossanyi, "The Design of Closed Loop Controllers for Wind Turbines." Wind Energy 2000: 3: 149-163.

* cited by examiner

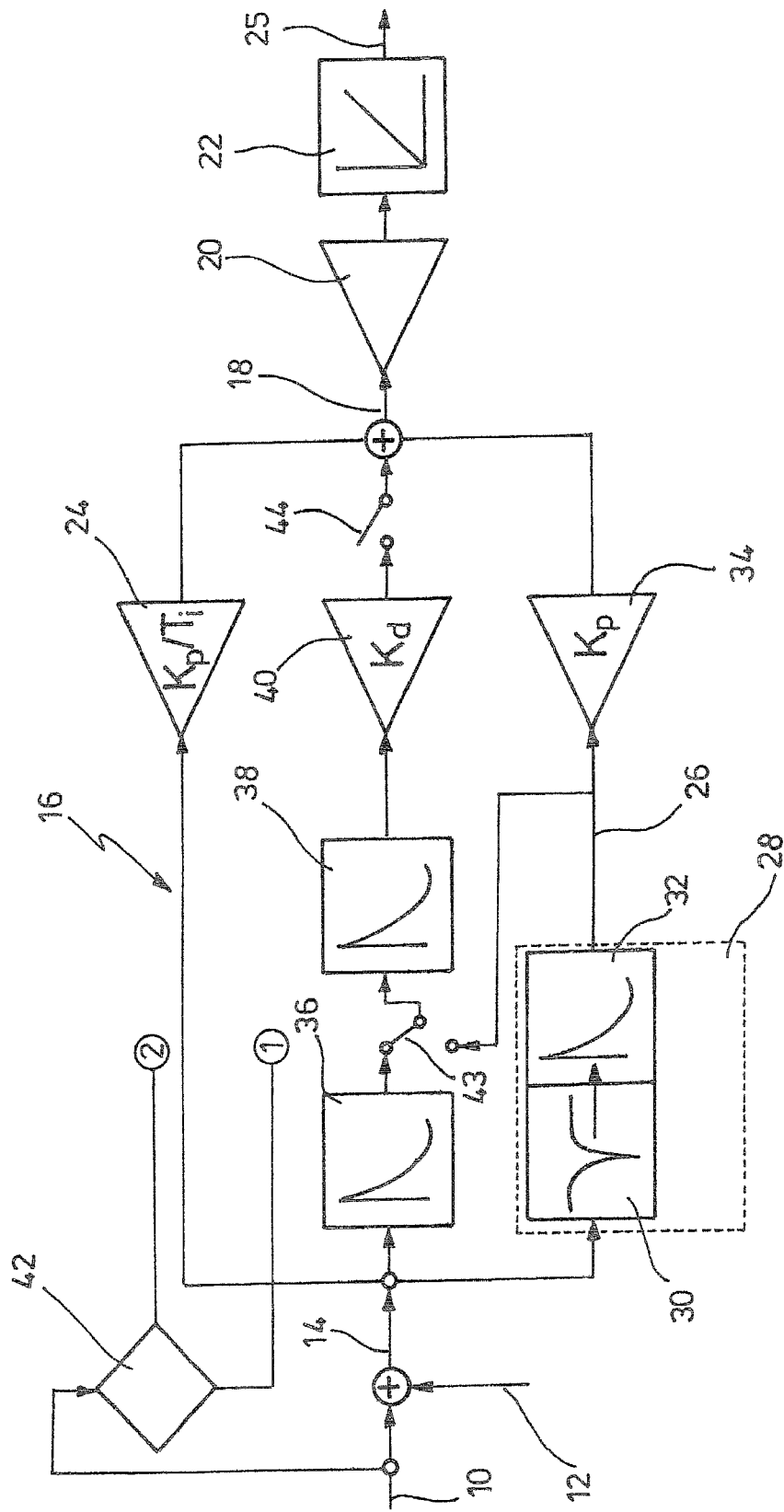

CONTROLLER FOR A BLADE ADJUSTMENT ANGLE OF AT LEAST ONE ROTOR BLADE OF A WIND POWER PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Wind power plants with a controller of the blade adjustment angle are known. The controller of the blade adjustment angle makes it possible to balance the power and torque fluctuations of the wind power plant. The effectiveness with respect to the reduction of load peaks depends decisively on the reaction time of the controller, i.e. on the blade adjustment speed. Due to the inertia of the mass to be moved and because an overload of the actuating elements needs to be avoided, the blade adjustment angle controller is not in the position to react to short-term fluctuations in wind speed (see Erich Hau, Windkraftanlagen [Wind Power Plants], $3^{rd}$ Edition, Springer Verlag, Chapter 6.3), the entire contents of which is incorporated herein by reference.

With the demands on wind power plants due rotor blade diameters that are constantly increasing in size, the previous pitch controller approaches can no longer be used. The controller becomes increasingly slow so that power and torque deviations in the case of large rotor blade diameters of future wind power plants cannot be effectively corrected.

The object of the invention is to provide a controller for the blade adjustment angle of at least one rotor blade that permits an effective regulation for a large rotor blade diameter without overloading the actuating elements and that can simultaneously be used for wind power plants with smaller rotor blade diameters.

BRIEF SUMMARY OF THE INVENTION

The controller according to the invention serves to regulate a blade adjustment angle for at least one rotor blade of a wind power plant. Occasionally, this controller is also called a blade adjustment angle controller or pitch controller for short. In the case of the controller according to the invention, a regulation takes place, in which, depending on an operating state of the wind power plant, a first controller branch is switched on for the determination of the blade adjustment angle. With the switchable controller branch, the controller of the blade adjustment angle according to the invention can perform two different regulation processes for the target value determination of the blade adjustment angle depending on an operating state of the wind power plant. According to the invention, at least one differentiating member is provided in the first controller branch, which permits a fast and dynamic regulation even in the case of large rotor blade diameters. Through the switching on of the first controller branch with its at least one differentiating member, it is possible to change the controller behavior depending on the operating state. The special advantage of the controller according to the invention is also that it can be used both for wind power plants with smaller rotor blade diameters and, through suitable selection of the operating state, which triggers a switch, for wind power plants with large rotor blade diameters.

In the case of a preferred embodiment of the controller according to the invention, a regulation of the blade adjustment angle takes place in a first operating state via a second and a third controller branch. The first operating state is preferably defined as a partial load mode of the wind power plant. In partial load mode of the wind power plant, it does not work with the nominal power, but is instead operated with a lower power value.

In a preferred embodiment of the controller according to the invention, a first predetermined switch-over value is available for a generator and/or a rotor speed. A measured actual value for the generator and/or rotor speed is compared with the first predetermined switch-over value. If the actual value is less than the switch-over value, then the controller according to the invention works with the second and third controller branch. In the case of the preferred embodiment of the controller according to the invention, a regulation takes place exclusively via the second and third controller branch for speed values less than the first switch-over value. In the range of the low speeds, a regulation can take place in the generally known manner via the second and third controller branch. This embodiment of the invention is based on the knowledge that, in the case of high speeds, a faster, more dynamic regulation of the blade adjustment angle is possible than in the case of lower speeds, in which a too frequent correction of the pitch angle is undesirable. Furthermore, the switch-over also makes it possible, depending on a switch-over value for the generator and/or rotor speed, to use the controllers used up until now and modified for the wind power plants in wind power plants with large rotor blade diameters, which require dynamic regulation for high speeds.

In the case of the controller according to the invention, a regulation of the blade adjustment angle also takes place via the first controller blade, if a second operating state is determined. The second operating state is preferably present in full load mode of the wind power plant. The second operating state can also be present for a transition range from partial load mode to full load mode.

A second predetermined switch-over value for the generator and/or rotor speed is preferably specified in the controller. The second switch-over value is compared with an actual value for the generator and/or rotor speed. If the actual value for generator and/or rotor speed is greater than the second switch-over value, the first controller branch switches to the second and third controller branch. The switching can also include the fact that one or both of the previously used controller branches are no longer used. The first and second switch-over value can have the same value.

In a particularly preferred embodiment, a proportional filter coordinated with the power train oscillations is provided in the second controller branch. The proportional filter suppresses the oscillations in the power train, i.e. speed deviations in the rotor shaft, a transmission and potentially in a coupling. The signals of the second controller branch are also preferably supplied to the output of the controller in addition to the signals of the third controller branch.

The third controller branch, which is preferably always in use regardless of the operating states of the wind power plant, has an integration member, with which the regulation difference supplied to the controller is integrated.

BRIEF DESCRIPTION OF THE VIEW OF THE DRAWING

FIG. 1 is a schematic block diagram of the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows a schematic view of the structure of the pitch controller to which an actual value 10 of the generator speed is supplied. The target value 12 of the generator speed is subtracted from the actual value of the generator speed in order to form an error variable 14. The error variable 14 is supplied to the controller 16. The signal on the controller output 18 is converted to an output variable 25 of the blade adjustment angle via a proportional amplification 20 and a characteristic field 22. An adjustment of the blade adjustment angle takes place depending on the converted output variable 25.

The controller 16 has an integrating member 24, which amplifies the signals in an integrating manner regardless of the operating state of the wind power plant. In a second controller branch 26, the supplied signals are filtered through a proportional filter 28. The proportional filter 28 consists of a band-stop filter 30 and a differentiating member 32. The band-stop filter 30 is designed such that oscillations in the power train are suppressed before they are transferred to the differentiating member 32. The signals are subsequently amplified via a proportional member 34 and are forwarded to the output of the controller.

The first controller branch can be seen in the middle of the controller shown. The first controller branch has two series-connected differentiating members 36 and 38 and a proportional member 40. A switch 43, which switches depending on the actual value of the generator speed, can be provided between the differentiating members 36 and 38. A query of the threshold value 42 checks for the switching whether the actual value of the generator speed is greater than a predetermined threshold value. If the test shows that the actual value is less than the threshold value, then differentiating members 36 and 38 are connected with each other via switch 43. On the other hand, if the current value of the generator speed is greater than the threshold value, the differentiating member 38 is connected with the output of the proportional filter 28.

Furthermore, a second switch 44 is provided in the second controller branch, making it possible to connect the first controller branch with the controller output 18 in production mode.

When the controller according to the invention is used, the following process takes place:

The wind power plant always works with open switch 44, i.e. rotor blades with normal rotor blade lengths are used. The overall operation of the wind power plant always takes place via the third controller branch (the integrating member 24) and the second controller branch 26. Due to the proportional filter 28, the controller is insensitive to the oscillations of the power train. At the same time, time constants of the differentiating member 32 are selected such that a slow regulation takes place. Switch 43 has no effect in this type of operating.

The wind power plant works with closed switch 44, i.e. rotor blades with large rotor blade lengths are used. If the actual value 10 of the generator speed is below the predetermined threshold value 42, the output of the first differentiating member 36 is fed over switch 43 and the first controller branch with the differentiating members 36, 38 contributes to the controller result. In this state, the second controller branch 26 also delivers a result via the controller output 18. The series connected differentiating members 36, 38 allow the selection of time constants, which permit a fast regulation, in particular for switching the wind power plant to the network, in which the regulation of the speed only takes place via the pitch controller. Since the first controller branch is independent of the filtered values of the proportional filer 28, a direct regulation takes place here, which permits in this working range a reliable and fast compensation of oscillations of the generator speed.

The wind power plant works with closed switch 44, if the wind power plant is equipped with long rotor blades. If the actual value 10 of the generator speed is higher than the threshold value 42, then production mode is present and the signal processing takes place via the integrating member 24 and the second controller branch 26. Due to the proportional filter 28, the second controller branch is insensitive to the oscillations of the power train. At the same time, time constants of the differentiating member 32 are selected such that a slow regulation takes place. The switch 43 connects the output of the proportional filter 28 with the input of the differentiating member 38 and the output signals of the proportional filter 28 are supplied to the output 18 of the controller via the differentiating member 38 and the proportional member 40. The additional differentiating member 38 now allows the provision of a time constant, which permits a fast reaction of the controller to the supplied signals. The effects of the power train oscillation are thus attenuated. However, the regulation remains dependent on the filtered values of the proportional filter 28.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A controller controlling the blade adjustment angle of at least one rotor blade of a wind power plant, the controller comprising a first controller branch being switched for the determination of the blade adjustment angle depending on the operating states of the wind power plant, wherein at least one differentiating member is provided in the switched first controller branch, further wherein in a first operating state a regulation of the blade adjustment angle takes place via a second and a third controller branch (26, 16), and wherein the first operating state is present in partial load mode of the wind power plant.

2. The controller according to claim 1, characterized in that a predetermined switch-over value for at least one of the generator or rotor speed is present and is switched to the first operating state in the case of an actual value for the at least one of the generator or rotor speed less than the switch-over value.

3. The controller according to claim 1, characterized in that an integration member is provided in the third controller branch.

4. A controller controlling the blade adjustment angle of at least one rotor blade of a wind power plant, the controller comprising a first controller branch being switched for the determination of the blade adjustment angle depending on the operating states of the wind power plant, wherein at least one differentiating member is provided in the switched first controller branch, characterized in that in a second operating state a regulation of the blade adjustment angle takes place additionally via the first controller branch, and wherein the second operating state is present in full load mode.

5. The controller according to claim 4, characterized in that the second operating state is also present in full load mode during the transition from partial load mode.

6. A controller controlling the blade adjustment angle of at least one rotor blade of a wind power plant, the controller comprising a first controller branch being switched for the determination of the blade adjustment angle depending on the operating states of the wind power plant, wherein at least one differentiating member is provided in the switched first controller branch, characterized in that in a second operating state a regulation of the blade adjustment angle takes place additionally via the first controller branch, and further characterized in that a second switch-over value for at least one of the generator or rotor speed is present and is switched to the second operating state in the case of an actual value for the at least one of the generator or rotor speed greater than the second switch-over value.

7. A controller controlling the blade adjustment angle of at least one rotor blade of a wind power plant, the controller comprising a first controller branch being switched for the determination of the blade adjustment angle depending on the operating states of the wind power plant, wherein at least one differentiating member is provided in the switched first controller branch, further wherein in a first operating state a regulation of the blade adjustment angle takes place via a second and a third controller branch (26, 16), and characterized in that a proportional filter (28) coordinated with the power train oscillations is provided in the second controller branch.

8. The controller according to claim 7, characterized in that an integration member is provided in the third controller branch.

* * * * *